United States Patent [19]

Rudolph et al.

[11] Patent Number: 4,682,750
[45] Date of Patent: Jul. 28, 1987

[54] LOW PROFILE EXTENSIBLE SUPPORT PLATFORM

[75] Inventors: Steven M. Rudolph, David City; Donald J. Maxwell, Lincoln, both of Nebr.

[73] Assignee: Eidos Corporation, David City, Nebr.

[21] Appl. No.: 913,008

[22] Filed: Sep. 26, 1986

[51] Int. Cl.$^4$ ............................................ F16M 13/00
[52] U.S. Cl. ................... 248/421; 248/157; 248/161; 248/678
[58] Field of Search ............... 248/421, 157, 161, 676, 248/678; 108/145, 147; 280/47.34, 47.35, 47.36

[56] References Cited

U.S. PATENT DOCUMENTS

| | | | |
|---|---|---|---|
| 2,805,905 | 9/1957 | Levitan et al. | 108/145 |
| 3,110,476 | 11/1963 | Farris | 108/147 UX |
| 4,558,648 | 12/1985 | Franklin et al. | 248/421 X |
| 4,577,821 | 3/1986 | Edmo et al. | 248/421 |

FOREIGN PATENT DOCUMENTS

| | | | |
|---|---|---|---|
| 1107915 | 5/1961 | Fed. Rep. of Germany | 248/421 |
| 0554671 | 7/1943 | United Kingdom | 248/421 |

OTHER PUBLICATIONS

Thomas Register, 1986, "Lifts, Hydraulic", (pp. 9801–9804); Lifts, Aerial" (p. 9797), Lifts, Battery (p. 9791).

Primary Examiner—Ramon O. Ramirez
Attorney, Agent, or Firm—Schmidt, Johnson, Hovey & Williams

[57] ABSTRACT

Twin linkage assemblies shift a support platform between a low profile, fully collapsed position and a fully extended position of a height suitable for supporting a workman underneath an aircraft or for supporting, for instance, an engine at a comfortable working position. A hydraulic cylinder and piston assembly is connected at opposite ends to swivel members and torque arms, the latter of which are connected to short links which in turn are coupled to linkages interconnecting a base and the work supporting platform. The torque arms, in cooperation with the swivel members, facilitate swinging of the links and linkages to reduce the force necessary to separate the platform and base to a value smaller than would otherwise be required. In preferred embodiments, opposite end regions of the cylinder and piston are provided with trunnions that carry the swivel members and which engage stops mounted to the platform and base, to resist rotational urging of the piston and cylinder assembly and to assist the torque arms in swinging the links and associated linkages both when the assembly is collapsed and when the assembly is extended.

9 Claims, 10 Drawing Figures

LOW PROFILE EXTENSIBLE SUPPORT PLATFORM

BACKGROUND OF THE INVENTION

1. Field of the Invention

This invention relates to a low profile lift assembly having a horizontal support platform that is movable toward and away from a base in parallel relationship thereto. The assembly has unique extension structure which significantly decreases the ratio of collapsed height to extended height, maximizes the permissible load on the operating components and reduces the amount of force necessary to overcome resistance to movement when the assembly is extended from its initially fully collapsed state. The portable work stand thereby presented is especially useful for supporting a mechanic in a horizontal position or for carrying a load such as the engine of an aircraft or an automobile, and includes a number of linkages which provide substantially equal support over the entire area of the work platform regardless of the degree of extension of the latter from the base.

2. Description of the Prior Art

Aircraft mechanics and similar workers have long felt a need for a roller creeper having a platform which can be extended upwardly to enable the user to more conveniently work on the underside of an aircraft which is normally substantially higher from the ground than the underside of an automobile or truck. Conventional practice of mechanics has been to raise the effective height of typical creepers in incremental units by adding books, boxes, boards or other make-shift members to the top of the creeper until a proper elevation is approximately attained. As can be appreciated, such practice is inconvenient at best and usually cannot provide support for the worker at just the right height in steady fashion and free of risk.

However, comfort of the mechanic is an often overlooked factor which can greatly contribute to work productivity in terms of both the time necessary to complete the job as well as the overall quality of the work once finished. A mechanic working on the underside of aircraft without proper support at a comfortable working distance from the aircraft components constantly shifts his or her body to relieve muscle stress and fatigue, and these body movements, whether consciously or unconsciously initiated, substantially increase the time necessary to complete the job and also contribute somewhat to mental stress since the normal train of thought is consequently interrupted.

In other instances, it would be desirable to have a wheeled dolly available which is provided with a vertically extensible support platform for carrying tools, engines or other items and that is selectively movable both in vertical as well as in horizontal directions. For example, a dolly for removing engines from vehicles should be lightweight and thus readily portable, while having sufficient strength to safely carry the engine at a height convenient for performing work functions thereon, rendering unnecessary the practice of transferring the engine from the dolly to a work table once the engine is removed from the vehicle. As another example, it would be desirable to be able to remove engines from relatively large helicopters by provision of a portable wheeled dolly which can be rolled up a ramp into the fuselage, and wherein a work supporting surface can be raised a sufficient height in order to meet the engine as it is uncoupled from its normal elevated position with respect to the helicopter deck.

Unfortunately, conventional scissors lift tables are unsatisfactory for a number of reasons. Scissors lifts often comprise two pairs of elongated, rigid links, one pair of which is pivotally connected to the base and shiftably connected to the platform, and the other pair of which is pivotally connected to the platform and shiftably connected to the base. A hydraulic piston and cylinder assembly secured to the base and coupled to the linkages is operable such that extension or retraction of the piston shifts the platform either away from or toward the base. However, as the linkages in the conventional scissors lift table are pivoted to raise the support platform, adjacent ends of the linkages simultaneously shift toward one another. The result is that the raised platform is no longer supported equally in all corners by the linkages; one end of the platform in effect "overhangs" the linkages. To overcome this deficiency, scissors lift tables are often manufactured of relatively heavy materials and are derated in capacity so that loads carried by the unsupported, or cantilevered region of the platform cannot tip over the assembly. As can be appreciated, such scissors lift tables are consequently heavy and cannot be readily transported by a single person.

In the construction of lift tables having linkages which are swingable in arcs to shift a work supporting platform toward and away from a base, it is difficult to provide a sufficient amount of "starting" force for initially separating the platform from the base especially when the platform is carrying a load. For the most part, prior art lift tables have overcome starting forces by provision of large piston and cylinder assemblies, and have utilized relatively hefty linkages, pins and pivot assemblies to minimize bending and excessive stress. Again, however, such practices unacceptably increase the weight of the entire assembly to the point where the latter cannot be conveniently carried by the worker when necessary while still remaining a load bearing capability sufficient to meet the demands of the job.

SUMMARY OF THE INVENTION

The present invention represents a significant advance in the art by provision of a support platform assembly having two pairs of opposite linkage sets which provide substantially equal support to all areas of the platform regardless of the elevation of the latter. Furthermore, relatively lightweight components may be used so that the assembly can easily be manually transported when necessary. The ratio of the extended height to the collapsed height of the support platform is significantly increased and is approximately twice that of the known comparable art when load bearing to weight and complexity factors are taken into account. The assembly of the present invention is of sufficient strength for supporting an engine, a worker, or a number of tools as may be necessary.

The linkage sets include four spaced, generally parallel linkages which extend between the platform and the base, as well as four relatively short links which are pivotally connected to the linkages at bisecting locations thereon. The links are also pivotally connected to either the base or the support platform. A hydraulic piston and cylinder assembly is coupled by swivel members to torque arms fixedly connected to the short links, and the torque arms are strategically positioned to improve the mechanical advantage of the linkages and links.

It has been found that the torque arms considerably reduce the amount of force which the hydraulic piston and cylinder assembly must exert to force the links apart when the platform is initially raised from a fully collapsed position. In one example, the lifting force has been reduced from approximately 7,300 pounds to approximately 2,600 pounds. The addition of the swivel members which interconnect the piston and cylinder assembly and the torque arms also enables the use of a longer piston and cylinder assembly than would otherwise be possible because of the limited distance between the support points for the assembly when the linkages are fully collapsed.

In preferred forms of the invention, the cylinder and piston are each provided with trunnions which pivotally carry the swivel members, and both of the trunnions are engageable with stops connected to the platform and base respectively which provide support for the trunnions as the piston is extended and resist the tendency of the piston and cylinder assembly to rotate and "right itself", and thereby assist the torque arms in causing swinging movement of the links and linkages. The addition of the stops in the above example has been found to further reduce the force necessary to shift the linkages apart, from the aforesaid value of 2,600 pounds when the torque arms alone are utilized to a value of 1,200 pounds when the stops are added.

In other embodiments, a spring yieldably biases the swivel members away from positions wherein the longitudinal axes of the latter are parallel with the axis of the piston. Misalignment of the swivel members relative to the line of force presented by the piston improves the mechanical advantage of the links, linkages and swivel member during retraction of the piston as the assembly is collapsed. A lug fixedly coupled to each of the swivel members is engageable with corresponding torque arms to limit the inclination of the longitudinal axis of the hydraulic cylinder and piston assembly relative to both of the swivel members.

DETAILED DESCRIPTION OF THE DRAWINGS

An extensible support platform assembly, broadly designated 20, is illustrated in FIGS. 1-10 and includes a base 22 and a platform means or platform 24, the latter of which includes a removable flat top 26. The base 22 (FIGS. 1-5) is generally rectangular and tubular, and has two side bars 28, two end bars 30 connected to the side bars 28, two intermediate bars 32 (FIGS. 2-4) which join the side bars 28, and a first stop means or stop 34 which is mounted atop on of the intermediate bars 32. The base 22 also carries four wheels 36 located to retain base 22 above the level of the ground.

The platform means 24, similar to the base 22 is tubular and generally rectangular, and includes two spaced side bars 40 (see e.g., FIG. 2), two end bars 42 joined to the side bars 40, two intermediate bars 44 interconnecting the side bars 40 and a second stop means or stop 46 which is mounted to the underside of one of the intermediate bars 44. The platform 24, including the bars 40, 42 and 44 extends in a normally horizontal plane thereby defining a work supporting surface which is parallel to a plane that passes through the longitudinal axes of bars 28, 30 and 32 of base 22.

Two spaced linkages 48, comprising a first pair of linkages, each have a lower segment connected to the base 22 by pivots 50 for swinging movement about a common horizontal axis as illustrated in FIGS. 1 and 3-5. Each of the first pair of linkages 48 is also shiftably coupled to the platform 24 by means of two rollers 52 which are received in C-shaped channels 53 forming as part one of the side bars 40. As viewed in more detail in FIG. 9, the rollers 52 are coupled to elements 55 fixed to upper segments of respective linkages 48, and a horizontal rod 57 securely interconnects the two elements 55.

Again referring to FIG. 5, two spaced linkages 56, comprising a second pair of linkages, are each connected at an upper portion thereof to one of the side bars 40 of platform 24 by means of pivots 58. This enables the second pair of linkages 56 to swing about a common horizontal axis. The linkages 56 are also shiftably connected to the base 22 by rollers 60 which resemble rollers 52 and which are received in a C-shaped channel 61 forming a portion of side bars 28 of base 22. Rollers 60 are coupled to elements 63 fixed to a lower portion of a respective linkage 56, and the linkages 56 swing in an arc as rollers 60 shift along channel 61. A rod 65 fixedly interconnects the two elements 63.

Each of a first pair of link means, comprising relatively short links 64, is coupled at a lower end portion thereof by a respective pivot 66 to an intermediate region of one of the first pair of linkages 48. An upper end of each of the links 64 is connected by a pivot 68 to one of the side bars 40 of the platform 24, and all of the pivots 66, 68 are oriented for swinging movement of the links 64 about horizontal axes. Preferably, pivot 66 is located at a midpoint along the length of the respective linkage 48 to bisect the latter and to form an isoceles triangle, although it is at least theoretically possible to locate the pivots 66 at another position along the length of linkages 48 somewhat spaced from the midpoint thereof.

Two links 70, comprising a second pair of link means, each have an upper portion that is coupled by pivots 72 to a midpoint of one of the linkages 56. A lower portion of each link 70 is connected by a pivot 74 to one of the side bars 28 of base 22. Pivots 72, 74 are oriented for swinging movement of the respective link 70 about horizontal axes, and the links 70, along with a lower region of the linkages 56 and a portion of the side bars 28 of base 22, also form an isoceles triangle.

As the rollers 52 shift along the channels 53 of side bars 40 and rollers 60 roll along channels 63 of side bars 28, the linkages 48 swing in an arc about pivots 50 and rollers 52 while linkages 56 swing in an arc about pivots 58 and rollers 60 to thereby move the platform 24 either toward or away from the base 22 while maintaining the platform 24 in parallel relationship with the base 22. During such movement, the first pair of links 64 swing in vertical planes about pivots 66, 68 while the second pair of links 70 swing in vertical planes about pivots 72, 74.

Figure 2:
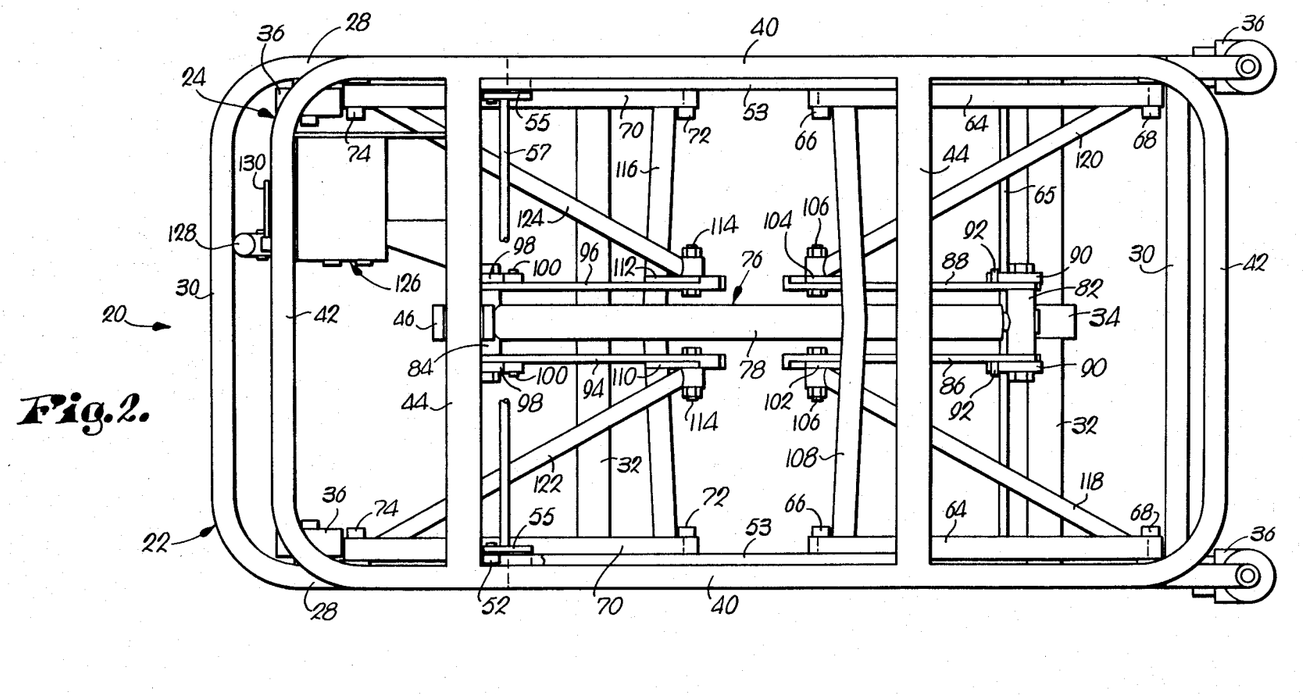
FIG. 2 is a plan view of the collapsed assembly shown in FIG. 1, with an uppermost top removed for clarity.
Figures 5, 8, 9, 10:
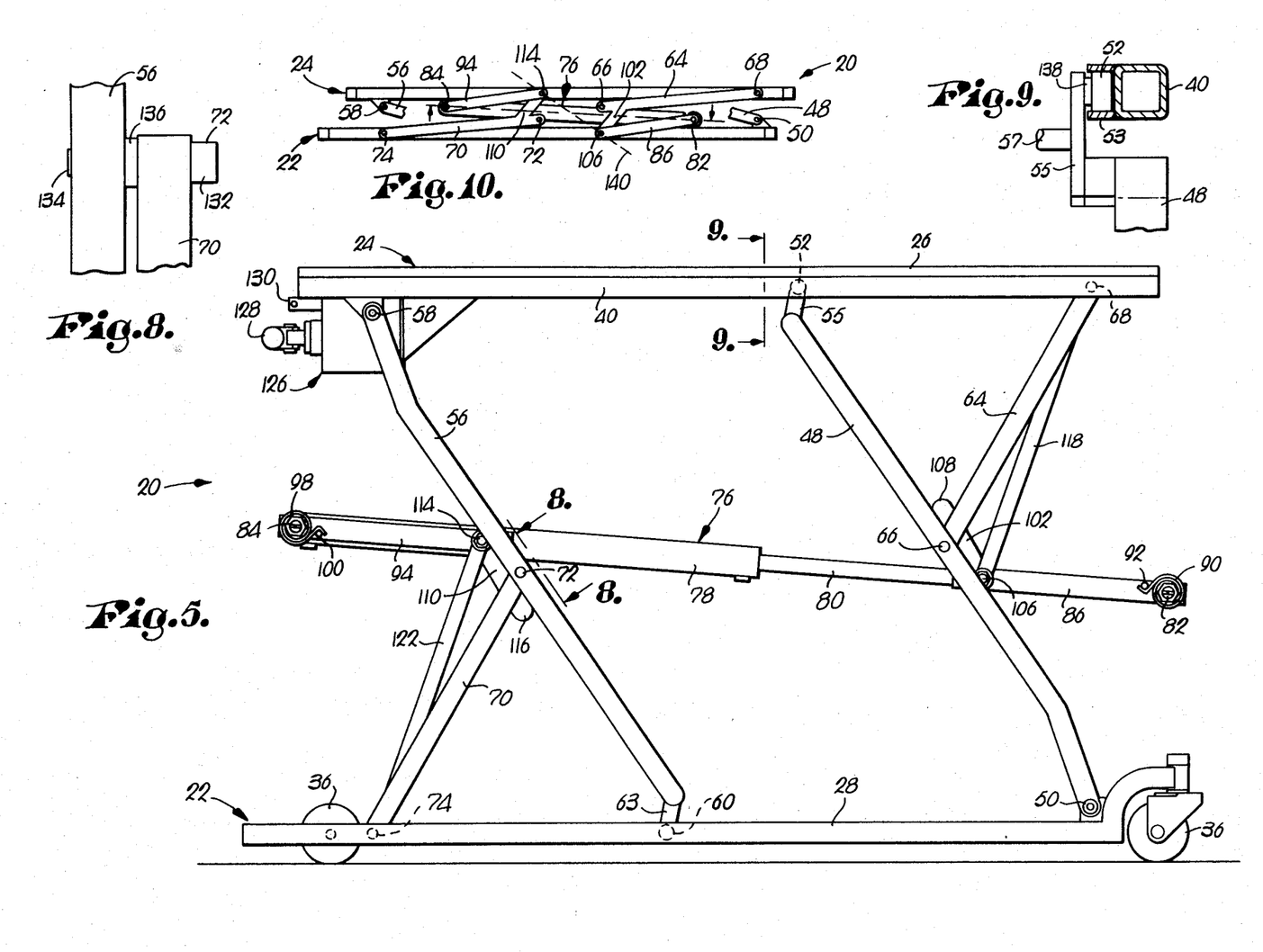
FIG. 5 is a side elevational view of the platform assembly shown in FIG. 1, wherein the platform is raised to its fully extended position and the end portions of the piston and cylinder assembly disengage respective stops connected to the platform and the underlying base.
FIG. 8 is an enlarged, fragmentary view taken along lines 8—8 of FIG. 5, showing the pivotal connection between one of the linkages and an associated link.
FIG. 9 is an enlarged, fragmentary sectional view taken along line 9—9 of FIG. 5, illustrating the shiftable connection between one of the linkages and side bar of the platform.
FIG. 10 is a reduced, fragmentary, side elevational view in partially schematic form of the piston and cylinder assembly, the torque arms and the links shown in FIGS. 1 and 3 when the assembly is in a fully collapsed position.
Figure 6:
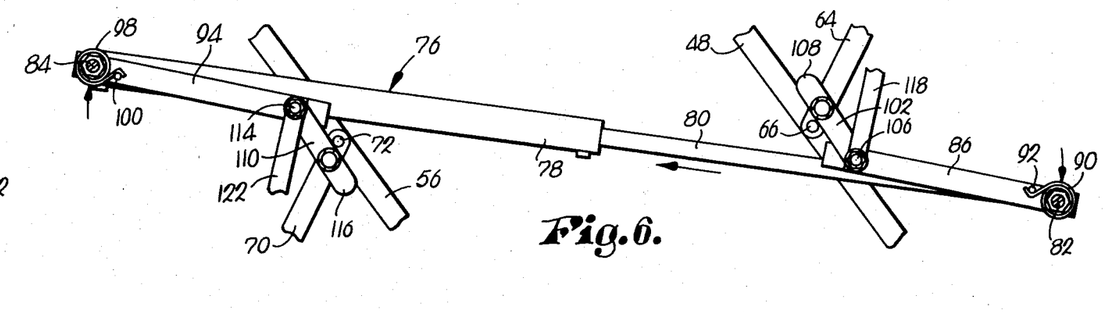
FIG. 6 is a fragmentary elevational view with parts in section showing a hydraulic cylinder and piston assembly along with linkages, links, torque arms and swivel members of the platform assembly shown in FIG. 5 when the assembly is in its fully extended position and hydraulic fluid pressure is presented for retraction of the piston to initiate lowering of the platform.

Extensible means 76 comprising a hydraulically powered piston and cylinder assembly has a cylinder 78 and a reciprocable piston 80 (FIGS. 5 and 6). A trunnion 82, as perhaps best viewed in FIG. 2, is secured to an end of the piston 80 and comprises a first end portion of the extensible means 76. A trunnion 84, similar to trunnion 82 is fixed to the end of the cylinder 78 remote from piston 80 and comprises a second end portion of the extensible means 76. Selective introduction of hydraulic fluid into either end of cylinder 78 shifts piston 80 such that the second end portion of the extensible means 76, including trunnion 84, is selectively moved along an axis either toward or away from the first end portion of extensible means 76 which includes the trunnion 82.

Viewing FIGS. 2, 5 and 6, a first elongated swivel member 86 and a third elongated swivel member 88 are both pivotally coupled to trunnion 82 for swinging movement about a common horizontal axis. Coil springs 90 are secured to trunnion 82 and engage pins 92 affixed to members 86, 88 for biasing the latter in a clockwise direction about trunnion 82 when viewed in the direction shown in FIG. 5.

A second elongated swivel member 94 and a fourth elongated swivel member 96 are pivotally coupled to the trunnion 84 of the second end portion of the extensible means 76 for swinging movement about a common horizontal axis. Two springs 98, fixed on opposite sides to trunnion 84, contact pins 100 fixedly connected to members 94, 96 and bias the members 94, 96 in a clockwise direction when viewing FIG. 5.

A first torque arm means, including an arm 102, interconnects the first swivel member 86 and one of the first pair of links 64. The first torque arm means also includes a third torque arm 104 (FIG. 2) that interconnects the third swivel member 88 and the remaining one of the first pair of links 64. As is most clearly illustrated in FIGS. 4 and 6, the torque arms 102, 104 are connected by pivots 106 to swivel members 86, 88 respectively for swinging movement about a common horizontal axis. An upper portion of each of the torque arms 102, 104 is fixedly secured to a horizontally extending, somewhat bowed cross bar 108 (FIG. 2) which in turn is fixed at opposite ends to a lower region of a respective one of the two links 64.

A second torque arm means pivotally interconnects the second swivel member 94 and the the second pair of links 70. More particularly, a second torque arm 110 and a fourth torque arm 112 are each coupled by pivots 114 to swivel members 94, 96 for swinging movement about a common horizontal axis, and a lower end of the torque arms 110, 112 is fixedly secured to a cross bar 116 (FIG. 2) which extends horizontally and which is fixed at each end to an upper region of both of the links 70.

Comparing FIGS. 2 and 5, two elongated braces 118, 120 extend diagonally within assembly 20 and include a lower portion rigidly connected to a lower region of torque arms 102, 104 respectively adjacent pivots 106 and also include an upper portion that is fixed to an upper region of each of the first pair of links 64. Likewise, braces 122, 124 extend diagonally within assembly 20 and include an upper portion fixedly coupled to an upper region of torque arms 110, 112 correspondingly adjacent pivots 114 and also include a lower portion mounted to a lower region of each of the second pair of links 70.

Finally, a source of hydraulic pressure for powering the extensible means 76 may take the form of a hydraulic pump 126, as shown in FIGS. 1–2 and 4–5. The pump 126 has a telescopically extensible handle 128 which is swingable about a horizontal axis. Swinging reciprocation of handle 128 causes pump 126 to develop fluid pressure that is then directed through one of two hoses (not shown) in accordance with a selected position of a switching valve 130. The hoses from the pump 126 are connected to opposite end segments of cylinder 78, so that piston 80 can be extended or retracted depending on the selected position of valve 130.

FIG. 8 depicts in more detail one of the pivots 72 which interconnects an upper portion of one of the second pair of links 70 with an intermediate region of one of the second pair of linkages 56. The pivot 72 comprises an enlarged, tool-engaging head 132 and a threaded, reduced diameter portion 134 remote from head 132. A spacer 136 is secured to linkage 56 to maintain link 70 in nonbinding, spaced relationship to linkage 56. Pivot 66, interconnecting one of the links 64 and one of the linkages 48, is similar to pivot 72 as illustrated in FIG. 8 and thus is not shown in detail.

On the other hand, FIG. 9 illustrates the particular nature of one of the rollers 52 which rolls along one of the channels 53 as the assembly 20 is extended or collapsed. Roller 52 extends horizontally from the element 55 in opposite relation to outwardly extending rod 57, and element 55 is fixed to an upper portion of a respective one of the first pair of linkages 48 by means of an intermediate spacer 138. Rollers 60, elements 63 and the associated components are similar to rollers 52 and elements 55 and consequently are not also illustrated in detail.

OPERATION

Figure 1:
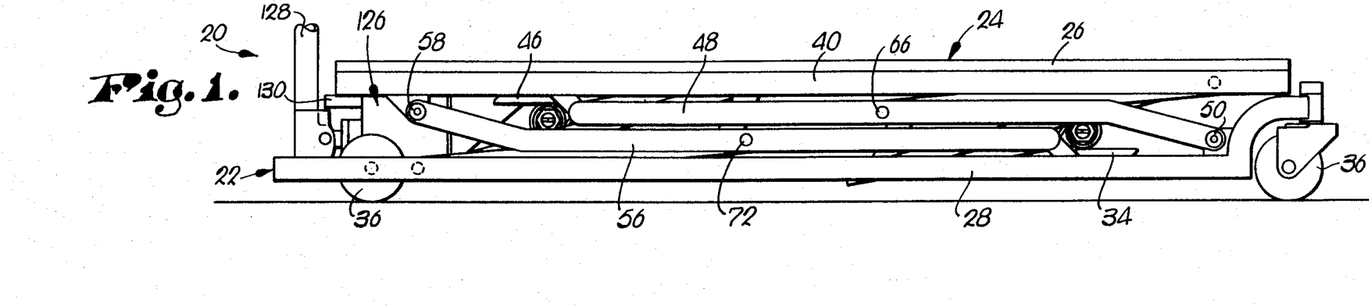
FIG. 1 is a fragmentary, side elevational view of the low profile extensible support platform assembly according to the principles of the present invention, showing the platform in its fully collapsed position.
Figure 3:
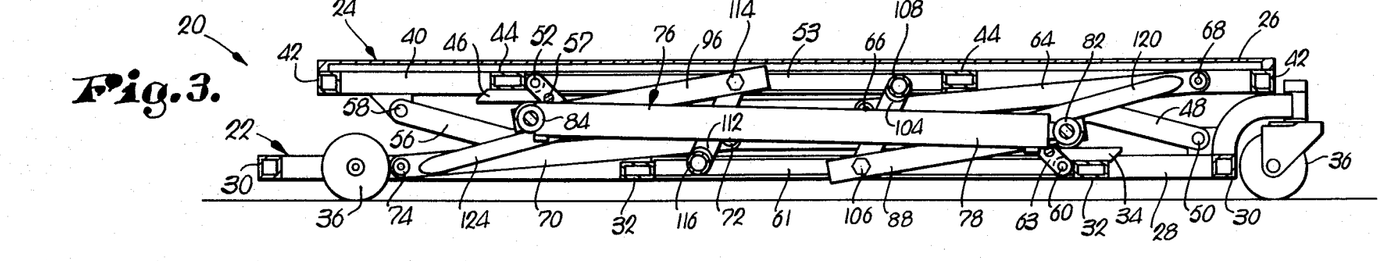
FIG. 3 is a side cross-sectional view of the assembly as shown in FIG. 1.

When the assembly 20 is initially in its fully collapsed position as is represented by FIGS. 1 and 3 and the somewhat schematic depiction of FIG. 10, and when the valve 130 is oriented to cause fluid pressure from pump 126 as generated by reciprocation of handle 128 to be forced to the end of the cylinder 78 adjacent trunnion 84, pressure within cylinder 78 exerts a force on piston 80 to bias the latter toward an extended position. As a result, the first end portion of extensible means 76, including trunnion 82, is directed away from the second end portion of extensible means 76, including trunnion 84.

Extension of piston 80 causes all of the swivel members 86, 88, 94 and 96 to simultaneously exert a force on the corresponding torque arm 102, 104, 110 and 112, and in turn a force is exerted by the torque arms on the first pair of links 64 and the second pair of links 70 to cause all of the latter to swing in an arc about the first pair of linkages 48 and the second pair of linkages 56. The torque arms 102, 104, 110, 112 exert a rotary force on corresponding links 64, 70 as well as pressure in a generally horizontal direction.

The torque produced by arms 102, 104, 110 and 112 reduces the force required to be generated by the cylinder 78 to about 40% of the value that would be required without such torque. In other words, a hydraulic piston and cylinder assembly hypothetically directly coupled between pivots 66 and 72 would have a very low mechanical advantage and exert severe pressure on the remaining components and interconnections thereof of the assembly, especially when the assembly is in a fully collapsed position and a significant "startup" force needs to be generated.

Moreover, the addition of swivel members 86, 88, 94 and 96 which function to transmit force from the extensible means 76 to respective torque arms 102, 104, 110 and 112, also permit the use of a longer cylinder 78 and piston 80 than would otherwise be possible. The dashed line identified as 140 in the schematic depiction of assembly 20 in FIG. 10 extends through pivots 106, 114 which are forced away from each other when platform 24 is raised, and it is noteworthy that this dashed line is not parallel with the axis of movement of extensible means 76. Misalignment of the swivel members 86, 88, 94 and 96 with the line of force generated by extensible means 76 causes the swivel members to rotate about corresponding trunnions 82, 84 and thereby exert an additional torque on respective torque arms 102, 104, 110 and 112.

Figure 4:
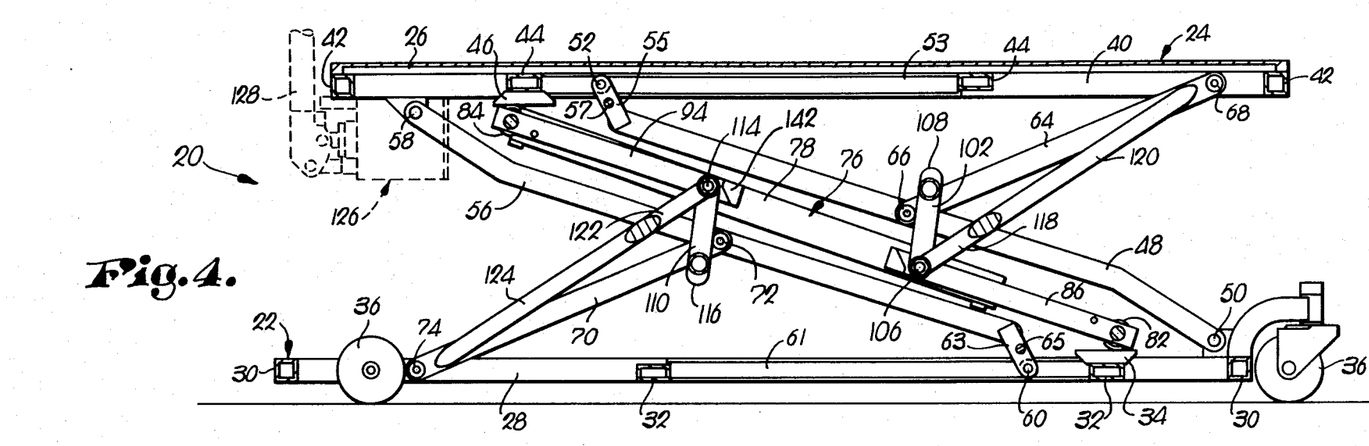
FIG. 4 is another side cross-sectional view of the assembly shown in FIG. 1 wherein a hydraulic piston and cylinder assembly has been partially extended to elevate the platform.

To further assist extension of the platform 24 from base 22 when the assembly 20 is in its fully collapsed position, trunnions 82 and 84 engage stops 34, 46 which prevent the trunnions 82, 84 from further rotating in a clockwise direction, viewing FIGS. 2–4. During extension of piston 80, contact of trunnions 82, 84 against stops 34, 46 produces a corresponding resistance to the clockwise urging of extensible means 76. Swivel members 86, 88, 94 and 96 are instead caused to rotate about trunnions 82, 84 thereby further reducing the overall force which must be generated by the extensible means 76 to about 20% of the force that would be required in an otherwise comparable assembly without such torque arms, swivel members and trunnions in contact with the stops respectively fixed to the base and work platform.

As the piston 80 shifts outwardly relative to cylinder 78, links 64, 70 swing in vertical planes about linkages 48, 56 respectively, and simultaneously cause linkages 48, 56 to swing in vertical planes about base 22 and platform 24 correspondingly, thereby shifting rollers 52, 60 along the length of side bars 40, 28 and moving the base 22 upwardly relative to the platform 24 while retaining the latter in substantially parallel relationship to base 22 at all times. As platform 24 continues to move in an upwardly direction, the assembly 20 assumes the configuration shown in FIG. 4, where it can be observed that trunnions 82, 84 are still in contact with stops 34, 46 respectively, although trunnions 82, 84 have shifted horizontally along stops 34, 46 somewhat from the position thereof shown in FIG. 3 in a direction away from each other.

Once the platform 24 is in the position shown in FIG. 4, further extension of piston 80 results in the trunnions 82, 84 begin moved out of disengagement with stops 34, 46 respectively as platform 24 is shifted away from base 22. However, as can be appreciated by reference to FIG. 4, the longitudinal axes of swivel members 86, 88, 94, 96 are now in alignment with the line of force generated by piston 80 such that the cylinder 78 and piston 80 are no longer biased in a clockwise direction. At this time, the force necessary to continue to shift platform 24 upwardly is somewhat smaller than the force required when the assembly 20 is extended from the fully collapsed position shown in FIGS. 1–3.

Continued extension of piston 80 causes links 64, 70 and linkages 48, 56 to continue swinging movement until platform 24 reaches the uppermost position depicted in FIG. 5, which represents the fully extended configuration of assembly 20. Comparing FIGS. 4 and 5, the longitudinal axes of cylinder 78 and piston 80 rotate in a counterclockwise direction once trunnions 82, 84 disengage stops 34, 46 and the line of force exerted by extensible means 76 approaches a generally horizontal direction. The height of platform 24, in FIG. 5, without wheels 36, is 29 inches from the bottom of base 22, and yet can be lowered to a height of about 5.3 inches when the assembly is in its fully collapsed configuration shown in FIG. 1 even though the components of assembly are of sufficient size and strength to readily carry a 600 pound load.

Figure 7:
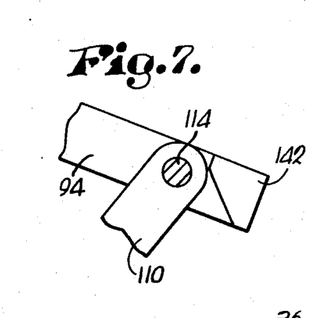
FIG. 7 is an enlarged, fragmentary, side elevational view of one of the torque arms and swivel members illustrated in FIG. 6, particularly depicting a lug fixedly connected to the swivel member and engageable with the torque arm when the piston is retracted to lower the support platform.

When it is desired to lower platform 24 and collapse assembly 20 from the orientation illustrated in FIG. 5, valve 130 is manually switched to allow hydraulic fluid pressure to flow toward the end of cylinder 78 remote from trunnion 84 whereby piston 80 withdraws intp cylinder 78. Retraction of piston 80 biases extensible means 76 in a clockwise direction, whereupon torque arms 102, 104, 110, 112 engage lugs 142 integrally formed in swivel members 86, 88, 94 and 96 correspondingly (see, e.g., lug 142 on swivel member 94 in FIG. 4) to limit the inclination of each respective torque arm and swivel member pair and to cause the links 64, 70 to swing toward a horizontal position, such as the position shown in FIG. 4. Movement of the links 64, 70 as such simultaneously swings linkages 48, 56 respectively, shifting roller 52, 60 along a portion of the length of side bars 40, 28 correspondingly until the assembly 20 reaches its fully collapsed position shown in FIGS. 1–3. FIG. 7 depicts in detail the lug 142 formed on second swivel member 94 and which is engageable with second torque arm 110, although similar lugs are disposed on swivel members 86, 88 and 96.

During retraction of piston 80, springs 90 exert a rotary, clockwise force viewing FIG. 5 on swivel members 86, 88 while springs 98 exert a clockwise bias on swivel members 94, 96. The swivel members 86, 88, 94, 96 swing in arcs until the integrally formed lug thereon (i.e., such as lug 142) contacts respective torque arms 102, 104, 110 and 112. At this moment, swivel members 86, 88, 94, 96 have reached a point of "cam over" with respect to the line of force generated by extensible means 76, and the lugs 142 thereafter stiffen respective swivel members 86, 88, 94, 96 to cause the latter to push instead of rotate.

Additionally, and as best appreciated by reference to FIGS. 1 and 3, the lower bent portion of each of the first pair of linkages 48 in cooperation with the upper bent portion of each of the second pair of linkages 56 allows the assembly 20 to be more fully nested when collapsed than would otherwise be possible, since the bent portions clear sleeves 52 and 60 as well as the remaining, major regions of the linkages 48, 56. Furthermore, the lateral box in crossbars 108, 116 provides clearance for extensible means 76 when the assembly 20 is fully collapsed and also assists in preventing side bars 28, 40 from deflecting inward when the platform 24 is raised.

As can now be appreciated by those skilled in the art, the use of the torque arms 102, 104, 110 and 112, in combination with trunnions 82, 84 in contact with stops 34, 46 enables the assembly 20 to be extended from a fully collapsed state with a minimum of generated hydraulic pressure which in turn enables the use of relatively lighter weight tubing and interconnecting components than would otherwise be possible. As such, the assembly 20 can be readily carried by the worker and yet have sufficient strength for supporting an engine or other relatively heavy loads. In practice, it has been found that the assembly 20 when constructed in accordance with the principles of the present invention can conservatively support a load of over 600 pounds, while weighing only approximately 92 pounds.

Moreover, the platform 24 can be extended to a height for supporting a mechanic, an engine or other items at a convenient working position while the platform 24 is securely supported in all four corner regions by linkages, in contrast to prior art "scissors type" lift tables which become more unsteady as the table is extended. Furthermore, orientation of the torque arms, swivel members and various linkages is such that the platform 24 can be lowered to such an extent that the assembly 20 assumes an extremely low profile when collapsed, allowing the same to be received in space having low clearance such as underneath the frame of vehicles.

We claim:

1. A low profile extensible support platform assembly comprising:
   a base extending generally in a reference plane;
   platform means extending generally in a plane substantially parallel to said reference plane and defining a work supporting surface;
   a first pair of spaced linkages each pivotally connected to said base and shiftably coupled to said platform means;
   a second pair of spaced linkages each pivotally connected to said platform means and shiftably connected to said base,
   each of said first pair of linkages and each of said second pair of linkages being elongated and presenting an intermediate region;
   a first pair of link means each pivotally coupled to said intermediate region of one of said first pair of linkages and each pivotally connected to said platform means;
   a second pair of link means each pivotally coupled to said intermediate region of one of said second pair of linkages and each pivotally connected to said base,
   said first pair of linkages during shifting movement along said platform means and said second pair of linkages during shifting movement along said base being swingable in an arc about said base and said platform means respectively for moving said platform means either toward or away from said base while retaining said platform means in substantially coplanar relationship with said base as said first pair of link means swings in an arc about said first pair of linkages and said platform means and as said second pair of link means swings in an arc about said second pair of linkages and said base;
   extensible means having a first end portion and a second end portion selectively movable along an axis toward and away from said first end portion;
   an elongated swivel member pivotally coupled to one of said end portions of said extensible means for swinging movement about the latter;
   torque arm means pivotally interconnecting said swivel member and an adjacent pair of one of said first and second pairs of link means;
   said torque arm means being positioned to exert a torque on an adjacent pair of said link means as said second end portion of said extensible means is moved away from said first end portion of said extensible means to exert tension on said swivel member and thereby said torque arms means, and to cause said first link means and said second link means to swing in an arc about said first pair of linkages and said second pair of linkages respectively; and
   stop means connected to one of said platform means and said base and engageable with one of said second end portion and said first end portion of said extensible means respectively for supporting said extensible means during engagement therewith and for opposing rotation of said extensible means about an axis transverse to its axis of extensible movement as said second end portion of said extensible means is moved away from said first end portion, to thereby simultaneously increase the tension on said swivel member and assist said torque arm means in exerting a torque on said adjacent pair of link means, and for simultaneously causing said first pair of linkages and said second pair of linkages to swing about said base and said platform means correspondingly to move said platform means away from said base as may be desired.

2. The invention of claim 1, wherein said one of said first end portion and said second end portion of said extensible means includes a trunnion pivotally coupling said swivel member to said extensible means and engageable with said stop means.

3. The invention of claim 1, wherein a lug is connected to one of said torque arm means and said swivel member for limiting the inclination of said swivel member relative to said extensible means.

4. The invention of claim 1; including means yieldably biasing said swivel member away from a position wherein the longitudinal axes of said swivel member is parallel with said axis of movement of said second end portion of said extensible means away from said first end portion.

5. The invention of claim 1, wherein said first pair of linkages and said second pair of linkages each include first segments parallel to each other, and second segments parallel to each other and inclined from respective first segments, for increasing clearance between said first pair of linkages and said second pair of linkages as said platform means approaches said base.

6. A low profile extensible support platform assembly comprising:
 a base extending generally in a reference plane;
 platform means extending generally in a plane substantially parallel to said reference plane and defining a work supporting surface;
 a first pair of spaced linkages each pivotally connected to said base and shiftably coupled to said platform means;
 a second pair of spaced linkages each pivotally connected to said platform means and shiftably connected to said base,
 each of said first pair of linkages and each of said second pair of linkages being elongated and presenting an intermediate region;
 a first pair of link means each pivotally coupled to said intermediate region of one of said first pair of linkages and each pivotally to said platform means;
 a second pair of link means each pivotally coupled to said intermediate region of one of said second pair of linkages and each pivotally connected to said base,
 said first pair of linkages during shifting movement along said platform means and said second pair of linkages during shifting movement along said base being swingable in an arc about said base and said platform means respectively for moving said platform means either toward or away from said base while retaining said platform means in substantially coplanar relationship with said base as said first pair of link means swings in an arc about said first pair of linkages and said platform means and as said second pair of link means swings in an arc about said second pair of linkages and said base;
 extensible means having a first end portion and a second end portion selectively movable along an axis toward and away from said first end portion;
 a first elongated member pivotally coupled to said first end portion of said extensible means for swinging movement about the latter;
 a second elongated member pivotally coupled to said second end portion of said extensible means for swinging movement about the latter;
 first torque arm means pivotally interconnecting said first member and said first pair of link means; and
 second torque arm means pivotally interconnecting said second member and said second pair of link means,
 said first torque arm means and said second torque arm means being positioned to exert a torque on said first link means and said second link means respectively as said second end portion of said extensible means is moved away from said first end portion of said extensible means to cause said first link means and said second link means to swing in an arc about said first pair of linkages and said second pair of linkages respectively and simultaneously cause said first pair of linkages and said second pair of linkages to swing about said base and said platform means correspondingly, for moving said platform means away from said base as may be desired.

7. The invention of claim 6; including first stop means connected to said base and engageable with said first end portion of said extensible with said first end portion of said extensible means during at least a portion of the time that said second end portion of said extensible means is moved toward and away from said first end portion; and second stop means connected to said platform means and engageable with said second end portion of said extensible means during at least a portion of the time that said second end portion of said extensible means is moved toward and away from said first end portion, said first stop means and said second stop means during engagement with said first end portion and said second end portion respectively being operable to facilitate swinging movement of said first member and said second member correspondingly about said extensible means as said first end portion is moved away from from said second end portion to thereby facilitate movement of said first pair of link means and said second pair of link means in an arc for shifting said platform means away from said base.

8. A low profile extensible support platform assembly comprising:
 a base extending generally in a reference plane;
 platform means extending generally in a plane substantially parallel to said reference plane and defining a work supporting surface;
 a first pair of spaced linkages each pivotally connected to said base and shiftably coupled to said platform means;
 a second pair of spaced linkages each pivotally connected to said platform means and shiftably connected to said base,
 each of said first pair of linkages and each of said second pair of linkages being elongated and presenting an intermediate region;
 a first pair of link means each pivotally coupled to said intermediate region of one of said first pair of linkages and each pivotally to said platform means;
 a second pair of link means each pivotally coupled to said intermediate region of one of said second pair of linkages and each pivotally connected to said base,
 said first pair of linkages during shifting movement along said platform means and said second pair of linkages during shifting movement along said base being swingable in arcs about said base and said platform means respectively for moving said platform means either toward or away from said base while retaining said platform means in substantially parallel relationship with said base as said first pair of link means swings in an arc about said first pair of linkages and said platform means and as said second pair of link means swings in an arc about said second pair of linkages and said base;
 extensible means having a first end portion and a second end portion selectively movable along an axis toward and away from said first end portion;
 first means interconnecting said first end portion of said extensible means and said first pair of link means;
 second means interconnecting said second end portion of said extensible means and said second pair of link means;

first stop means connected to said base and engageable with said first end portion of said extensible means during a portion of the time that said second end portion of said extensible means is moved toward and away from said first end portion; and second stop means connected to said platform means and engageable with said second end portion of said extensible means during a portion of the time that said second end portion of said extensible means is moved toward and away from said first end portion, said first stop means and said second stop means during engagement with said first end portion and said second end portion respectively being operable to support said extensible means during engagement therewith for facilitating movement of said first pair of linkages and said second pair of linkages in said arcs respectively and to thereby facilitate shifting of said platform means toward and away from said base.

9. The invention of claim 8, wherein said first means interconnecting said first end portion of said member and said first pair of link means includes an elongated member pivotally coupled to said first end portion and a torque arm pivotally interconnecting said first member and said first pair of link means.

* * * * *

UNITED STATES PATENT AND TRADEMARK OFFICE
CERTIFICATE OF CORRECTION

PATENT NO. : 4,682,750

DATED : July 28, 1987

INVENTOR(S) : Steven M. Rudolph and Donald J. Maxwell

It is certified that error appears in the above-identified patent and that said Letters Patent are hereby corrected as shown below:

In column 10, line 14, delete "coplanar" and substitute therefor --parallel--.

In column 11, line 39, delete "coplanar" and substitute therefor --parallel--.

Signed and Sealed this

Twelfth Day of April, 1988

Attest:

DONALD J. QUIGG

Attesting Officer      Commissioner of Patents and Trademarks